United States Patent
Umicevic

(10) Patent No.: US 10,390,151 B2
(45) Date of Patent: Aug. 20, 2019

(54) HEARING DEVICE FOR RECEIVING LOCATION INFORMATION FROM WIRELESS NETWORK

(71) Applicant: GN Hearing A/S, Ballerup (DK)

(72) Inventor: Daniel Umicevic, Ballerup (DK)

(73) Assignee: GN Hearing A/S, Ballerup (DK)

( * ) Notice: Subject to any disclaimer, the term of this patent is extended or adjusted under 35 U.S.C. 154(b) by 0 days.

(21) Appl. No.: 15/642,206

(22) Filed: Jul. 5, 2017

(65) Prior Publication Data

US 2018/0041847 A1    Feb. 8, 2018

(30) Foreign Application Priority Data

Aug. 4, 2016  (EP) .................................. 16182748

(51) Int. Cl.
*H04W 4/02*    (2018.01)
*H04W 4/30*    (2018.01)
(Continued)

(52) U.S. Cl.
CPC ......... *H04R 25/554* (2013.01); *H04R 25/505* (2013.01); *H04R 25/55* (2013.01);
(Continued)

(58) Field of Classification Search
CPC .. H04R 25/55; H04R 25/554; H04R 2225/39; H04R 2225/41; H04R 2225/55;
(Continued)

(56) References Cited

U.S. PATENT DOCUMENTS 9,703,524 B2 * 7/2017 Klimanis ................ G06F 3/165
2011/0293123 A1   12/2011 Neumeyer et al.
(Continued)

FOREIGN PATENT DOCUMENTS

DE    10 2014 207 311 A1    3/2015
EP         2 819 436 A1   12/2014
EP         2 884 766 A1    6/2015

OTHER PUBLICATIONS

Extended European Search Report dated Mar. 2, 2017 for corresponding EP Patent Application No. 16182748.0, 7 pages.

*Primary Examiner* — Jesse A Elbin
(74) *Attorney, Agent, or Firm* — Vista IP Law Group, LLP

(57) ABSTRACT

A hearing device includes: a microphone for converting an audio input signal into a microphone output signal; a processing unit configured to provide a processed output signal based on the microphone output signal for compensating a hearing loss of a user; a receiver connected to the processing unit for converting the processed output signal into an audio output signal; and a wireless radio receiver unit connected to the processing unit for receiving information from a wireless network; wherein the processing unit is configured to determine a location of the wireless network based on the information received from the wireless network; wherein the processing unit is configured to determine a sound processing profile based on the determined location of the wireless network; and wherein the processing unit is configured to provide the processed output signal based on the determined sound processing profile.

12 Claims, 5 Drawing Sheets

(51) Int. Cl.
  *H04R 25/00* (2006.01)
  *H04W 64/00* (2009.01)
(52) U.S. Cl.
  CPC ............... *H04W 4/02* (2013.01); *H04W 4/30* (2018.02); *H04W 64/00* (2013.01); *H04R 25/552* (2013.01); *H04R 2225/39* (2013.01); *H04R 2225/41* (2013.01); *H04R 2225/43* (2013.01); *H04R 2225/55* (2013.01); *H04R 2460/07* (2013.01)
(58) Field of Classification Search
  CPC .... H04R 2460/07; H04W 4/02; H04W 4/021; H04W 4/025; H04W 4/029; H04W 4/04; H04W 64/00; H04W 64/003
  USPC ..... 700/94; 381/315; 455/404.2, 456.1, 457, 455/456, FOR. 245
  See application file for complete search history.

(56) References Cited

U.S. PATENT DOCUMENTS

| | | | |
|---|---|---|---|
| 2012/0265717 A1* | 10/2012 | Narayanan | G06K 9/00 |
| | | | 706/12 |
| 2014/0045536 A1 | 2/2014 | Sydir et al. | |
| 2015/0336578 A1* | 11/2015 | Lord | B60T 17/22 |
| | | | 701/2 |
| 2016/0174001 A1* | 6/2016 | Ungstrup | H04R 25/505 |
| | | | 381/315 |
| 2017/0230767 A1* | 8/2017 | Simonides | H04R 25/554 |

* cited by examiner

HEARING DEVICE FOR RECEIVING LOCATION INFORMATION FROM WIRELESS NETWORK

RELATED APPLICATION DATA

This application claims priority to, and the benefit of, European Patent Application No. EP 16182748.0 filed on Aug. 4, 2016, pending. The entire disclosure of the above application is expressly incorporated by reference herein.

FIELD

The present disclosure relates to a method, a system and a hearing device for improving sound processing. The hearing device comprises a wireless radio receiver unit connected to the processing unit for receiving information from a wireless network.

BACKGROUND

Environment classification plays an important role in facilitating the best sound processing for a hearing impaired user of a hearing device. A large amount of processing power is today used to determine the environment based on acoustical sound input. This process has is limits in determining the environment as it needs a constant varying sound in order to adapt. In addition to the environment classifier in the hearing device, the hearing device user has the possibility to change the pre-set program in the hearing device to optimize the sound processing in a given situation or environment. This involves user intervention which not all users can do or want to do due to physical limitations such as other impairment or stigmatization. Therefore it is desirable to provide a system that is configured to optimize the sound processing based on more than the sound input, and without user intervention.

SUMMARY

There is a need for an improved system and hearing device configured to optimize the sound processing based on the physical location of the hearing device user and sound input.

Disclosed is a hearing device for improving sound processing. The hearing device comprises a processing unit configured to provide a processed output signal for compensating a hearing loss of a user. The hearing device comprises a microphone connected to the processing unit for converting an audio input signal into a microphone output signal to form an input signal to the processing unit. The hearing device comprises a receiver connected to the processing unit for converting the processed output signal into an audio output signal. The hearing device comprises a wireless radio receiver unit connected to the processing unit for receiving information from a wireless network. The processing unit is configured to determine a location of the wireless network based on the information received from the wireless network. As used in this specification, the term "location" may refer to any information associated with a certain place or environment. By means of non-limiting examples, such information may be a coordinate of a location, a name of an identifier of a location, a type of a location, etc (i.e., each of the above items may be considered an example of a "location"). The processing unit is configured to determine (e.g., establish, select, identify, etc.) a sound processing profile based on the determined location of the wireless network. The processing unit is configured to provide that the processed output signal is processed according to the established sound processing profile.

Also disclosed is a system comprising a hearing device and a wireless network, wherein the wireless network is configured to transmit information to the wireless radio receiver unit of the hearing device.

Also disclosed is a method of improving sound processing in a hearing device. The method comprises providing a processed output signal for compensating a hearing loss of a user. The method comprises converting an audio input signal into a microphone output signal to form an input signal. The method comprises converting the processed output signal into an audio output signal. The method comprises receiving information from a wireless network. The method comprises determining a location of the wireless network based on the information received from the wireless network. The method comprises establishing a sound processing profile based on the determined location of the wireless network. The method comprises providing that the processed output signal is processed according to the established sound processing profile.

It is an advantage that no extra electronic device, such as a mobile phone, is needed or required, as the sound processing is based on information from a wireless network transmitted directly to the hearing device. Thus an extra electronic device such as mobile phone is not needed or used for communicating with the hearing device, thus the user of the hearing device does not have to carry a mobile phone or to use a mobile phone in order to obtain the improved sound processing. Many people may not know how to use a mobile phone together with their hearing device as it may be somewhat advanced, such as older people or children, or many people may not want to use a mobile phone together with their hearing device because they find it too inconvenient or because of stigmatization, and in these cases it is an advantage that the hearing device can obtain improved sound processing by connection to a wireless network, where the user does not have to do perform any actions on or with the hearing device and/or on or with another electronic device, such as a mobile phone or smart phone.

It is a further advantage that the hearing device uses less battery power in obtaining the improved sound processing, as the hearing device does not use battery power to communicate with an extra electronic device, such as a mobile phone, and as the hearing device does not use battery power for communicating with a space based satellite system, such as the global positioning system (GPS), in order to obtain a GPS position or location of the hearing device.

The hearing device may use only a small amount of battery power to listen for and receive the location information transmitted from the wireless network.

It is an advantage that the hearing device user is not confronted with the stigma of having a hearing loss, by having to adjust the pre-set and/or program in the hearing device, and it is an advantage that a change of pre-set and/or program does not require a user intervention.

The wireless radio receiver unit in the hearing device can passively receive information from the wireless network, and thus the hearing device does not need to or have to transmit any information back to the network, thus the hearing device can remain undetected by the network.

The information received from the wireless network may comprise a network identification or network ID, and the network ID may comprise the location information.

The information received from the wireless network may comprise an identification marker, such as a Service Set Identifier (SSID) from a Wi-Fi network, or such as a Bluetooth/Bluetooth Low Energy (BLE) identify broadcast transmitter.

The wireless network from where information is received may be the wireless network that is present where the user wearing the hearing device is present. The wireless network may be such as Wi-Fi, WLAN, Bluetooth, BLE etc.

The hearing device may further comprise a 2.4 GHz radio antenna connected to the wireless radio receiver unit for communicating with and/or for receiving information from the wireless network.

The processing unit is configured to determine a location of the wireless network based on the information received from the wireless network, for example the information received from the wireless network comprises a location of the wireless network.

The processing unit is configured to determine a location of the wireless network which may be based on the information received from the wireless network and one or more of the following: information received from the user via a user input, information received via the wireless radio receiver unit and/or via a wireless transceiver.

The location of the wireless network may be a location identifying the wireless network, such as the environment of the network, e.g. at home, at a library, at a restaurant, or at work, because the hearing device recognizes the network ID as home, as library, as restaurant, or as work. Thereby the sound processing profile fits to the sound environment conditions in that location, e.g. fits home, fits quiet library, fits noisy restaurant, or fits work.

Furthermore, the location may be the name of the network, like "Tony's restaurant", and then the processing unit of hearing device can derive that the location is a restaurant and a sound processing profile suitable for a noisy restaurant may be selected.

The location may be a global positioning system (GPS) coordinate or a postal address, like a street name and house number. However in such cases, the hearing device may enable a connection to the Internet in order to retrieve information of which location this GPS coordinate or postal address is, or the location may be provided to the hearing device by user input on e.g. a mobile phone.

The processing unit is configured to establish a sound processing profile based on the determined location of the wireless network, for example the location name comprises the term "restaurant" and the sound profile per default selects a sound profile for noisy environments. An associated sound processing profile assigned to the specific location or the specific type of location may exist or may be provided.

It is an advantage that due to the established and/or selected and/or determined sound processing profile based on the location of the wireless network it is possible to maintain an overall sound processing profile or characterization throughout a varying sound stage at the location. For example the location name comprises the term "restaurant" and the sound profile per default selects a sound profile for noisy environments. Thus if there is no environment classifier in the hearing device, the sound processing profile will remain the same for the entire time that the hearing device user stays in the same location. If there also is an environment classifier in the hearing device, the same sound processing profile may remain for the entire time that the hearing device user stays in the same location, even though the environment classifier determines that the sound environment changes.

It is an advantage to use wireless network identification, such as W-Fi service set identification (SSID) information from the surroundings to identify which pre-set and/or program in the hearing device that would provide an optimized sound processing in that specific location. It is an advantage that it is not expected or required for the hearing device to join a wireless network, like a Wi-Fi network, instead the hearing device protocol capability can be limited to listen for network identification, such a SSID broadcasts, and receiving them. Furthermore, it is an advantage that transmission from the hearing device back to the wireless network is not required. It is an advantage that a location is identified based on identification of a number of for example SSIDs. Once a location is identified, a sound profile is established and maintained within the hearing device when the hearing device user is at that location. Further, it is an advantage that every time this location is identified, for example when the hearing device user returns to the same location, the hearing device can load the location pre-set and/or program suitable for that specific location.

It is an advantage that in addition to and/or as an alternative to location identification based on network identification, such as known SSID for Wi-Fi network, an adaptive system may be provided. This adaptive system is configured to interpret the network identification, such as the Wi-Fi SSID, in order to determine the location. This may be achieved be providing a list of words, to the hearing device processor, that can be associated with a specific type of location. E.g. words like "restaurant", "café", "diner", "bar", and/or certain "global brand names" in the network identification, e.g. the SSID, may trigger an environment classification of places where food is consumed and therefore may have a high possibility of being a noisy environment. Likewise, words like "library", "museum", "home" in the network identification, e.g. the SSID, may trigger an environment classification of places where there is quiet and therefore may have a low possibility of being a noisy environment. If the network identification, such as the SSID information, is either combined with the adaptive sound environment classifier and a consensus is achieved or if a network identification, such as SSID, is repeatedly detected for a given period, it may cause a change of pre-set/program in the hearing device.

For a Wi-Fi network, each basic service set (BSS) or extended service set (ESS) is identified by a service set identifier (SSID), which is a series of 0 to 32 octets. It is used as an identifier for a wireless LAN, and is intended to be unique for a particular area. Since this identifier often is entered into devices manually by a human user, it is often a human-readable string and thus commonly called the "network name". In an independent basic service set (IBSS), the SSID is chosen by the client device that starts the network, and broadcasting of the SSID is performed in a pseudo-random order by all devices that are members of the network.

Thus a wireless network owned by a restaurant called Tony's, will likely be called something like "Tony's restaurant" in the SSID. Correspondingly, the wireless network of a family home may likely be called something like "home". Due to these identifications, it is possible for the hearing device to receive network information describing which type of location the hearing device is in, such as restaurant, home, library etc., and a suitable sound processing profile for the specific type of location can thus be established.

In some embodiments the location of the wireless network comprises a type of location, and the processing unit may be configured to establish and/or select and/or determine the sound processing profile based on the type of location of the wireless network. This "type of location" may be used when the hearing device processing unit does not recognize the location and thus has to decide on a sound profile based on the name of the network, e.g. in a location called "restaurant" the sound profile may be a noisy environment, at a location called "home" the sound profile may be a quiet environment etc. An associated sound processing profile assigned to the type of location may exist. A type of location may be a restaurant, café, diner or bar; a transport hub like bus station, train station, airport; an office building, where there typically are a lot of noise, thus the sound profile fits a noisy environment in such location. Further, a type of location may be a library, a residential house or home, public park, nature resort, place of worship/religious place, where there typically are very little noise. A type of location may be a cinema, theatre etc. where there may be a varying sound profile etc.

In some embodiments the hearing device comprises a memory unit for storing the location of the wireless network. The location may be stored automatically or the user may type in the location, fx in an app on a mobile phone, or the user may inform the hearing device dispenser to store this location and a specific sound profile for this location, for example if the user frequently returns this location.

In some embodiments the sound processing profile based on the determined location of the wireless network is established by that the processing unit is configured to check whether the determined location appears as a known location in the memory unit with an associated sound processing profile assigned to the location. For example there may exist a "positive list" of known locations, and if the determined location is on this list, then the associated sound processing profile is applied in this location. Thus the processing unit is configured to recognize the location of the wireless network in the memory unit, when the user wearing the hearing device returns to the location stored in the memory unit. Typically the hearing device will receive identification information every 10 seconds, or every 15 second. Identification information received every 60 seconds may also be sufficient for establishing a suitable sound processing profile, if the hearing device user is moving around but is not moving so fast, fx walking.

In some embodiments the established sound profile established based on the location of the wireless network is configured to be changed to a different corrected sound profile, if the established sound profile appears not appropriate for the location of the wireless network. For example the location name comprises the term "restaurant" and the sound profile per default selects a sound profile for noisy environments. However if the hearing device user only or always visits the restaurant in the morning, when there is quiet in the restaurant, then the sound profile can be corrected to a sound profile for quiet locations. The sound profile may be changed in the processing unit and/or in the memory unit.

In some embodiments the established sound profile established based on the location of the wireless network is changed to a different corrected sound profile based on input from the user of the hearing device and/or by a hearing device dispenser. For example changed in an app on the user's mobile phone, or by the user visiting the dispenser and telling that the sound profile for this location should be changed to a different sound profile.

In some embodiments the hearing device comprises an environmental classifier for determining the sound environment of the hearing device, and wherein the processing unit is configured to compare the established sound profile established based on the location of the wireless network with the sound environment determined by the environmental classifier. It is an advantage that by having an environmental classification based location, a faster identification of the environment may be achieved compared to when having only an environment classification, and/or compared to when having only a location determination. An environmental classifier analyses the input signal to classify it into one of a number of different listening situations, such as seven different listening situations.

In some embodiments if the established sound profile established based on the location of the wireless network corresponds to the sound environment determined by the environmental classifier, then the established sound profile is maintained at the location. The processing unit may test and determine whether these correspond.

In some embodiments if the established sound profile established based on the location of the wireless network conflicts and/or diverges and/or does not correspond to the sound environment determined by the environment classifier, then the processing unit is configured to determine a combined sound profile for the location by determining a first weighting factor of the established sound profile established based on the location of the wireless network and by determining a second weighting factor for the sound environment determined by the environment classifier. The processing unit may test and determine whether these conflict, diverges or fail to correspond.

In some embodiments the wireless network is a Wi-Fi network, and the location of the wireless network may be determined based on a service set identification (SSDI) of the Wi-Fi network. In computer networking, a service set is a set consisting of all the devices associated with a consumer or enterprise IEEE 802.11 wireless local area network (WLAN). The service set can be local, independent, extended or mesh. Service sets have an associated identifier, the Service Set Identifier (SSID), which consists of 32 octets that frequently contains a human readable identifier of the network.

In some embodiments the location of the wireless network is determined based on a wireless identification marker of the wireless network. Additionally and/or alternatively to other wireless identification markers could be used. The wireless identification marker may be a Bluetooth or BLE broadcast transmitter. A Bluetooth low energy beacon may be used, which is a device that broadcasts a unique identifier to nearby portable electronic devices, such as to the hearing device. If using Bluetooth low energy (BLE), broadcast transmitters may be installed in different locations much as tele loops are installed in public buildings in northern Europe. These BLE identify transmitters may then have a specific location tag like: restaurants, libraries, place of worship, transport hubs, airports, train stations, cinema and theatre and others. However typically these BT or BLE transmitters do not have a name like "restaurant" but just numbers, so in order to use these to determine a location of the wireless network, it may require that the user defines the network the first time he is there and then this network can be recognized next time the user returns. Alternatively and/or additionally other parties may establish these BT or BLE identify transmitters, such as hearing device manufacturers, telephone companies etc.

In some embodiments the wireless identification marker is an identity transmitter having a specific location tag. For example a BT or BLE broadcast transmitter having a location tag like restaurant, library, place of worship, transport hub, cinema, etc.

In some embodiments the processing unit is configured to prevent that the processed output signal is processed according to the established sound processing profile based on the location of the wireless network if:

the number of different wireless networks present at the same time exceeds a predefined number; and/or the number of different wireless networks present within a predefined time interval exceeds a predefined number; and/or the information received from a number of different wireless networks establishes sound processing profiles which are conflicting and/or diverging and/or does not correspond.

The number of different wireless networks present at the same time may exceed a predefined number if the user is for example in a shopping mall and a lot of networks are present at the same time, then this criterion may be used to avoid that the sound processing profile changes too often and/or fast. A location may be verified or confirmed by detecting and comparing received signal strength (RSS) from the network, and the network with the strongest RSS will determine the location and thus the sound processing in case of many present networks.

The number of different wireless networks present within a predefined time interval may exceed a predefined number if the hearing device user moves fast, for example driving in a car or other vehicle, and then the sound processing profile should probably remain the same and not change for each new network location. Thus this criterion may be that if the hearing device detects a new network every 10 seconds, then the user is assumed to move fast and the sound processing profile should not apply with the network location.

The hearing device may be a hearing aid, a binaural hearing device, an in-the-ear (ITE) hearing device, an in-the-canal (ITC) hearing device, a completely-in-the-canal (CIC) hearing device etc. The hearing device may be a digital hearing device. The hearing device may be a hands free mobile communication device, a speech recognition device etc.

The present disclosure relates to different aspects including the hearing device described above and in the following, and corresponding system parts, methods, devices, systems, networks, kits, uses and/or product means, each yielding one or more of the benefits and advantages described in connection with the first mentioned aspect, and each having one or more embodiments corresponding to the embodiments described in connection with the first mentioned aspect and/or disclosed in the appended claims.

A hearing device includes: a microphone for converting an audio input signal into a microphone output signal; a processing unit configured to provide a processed output signal based on the microphone output signal for compensating a hearing loss of a user; a receiver connected to the processing unit for converting the processed output signal into an audio output signal; and a wireless radio receiver unit connected to the processing unit for receiving information from a wireless network; wherein the processing unit is configured to determine a location of the wireless network based on the information received from the wireless network; wherein the processing unit is configured to determine a sound processing profile based on the determined location of the wireless network; and wherein the processing unit is configured to provide the processed output signal based on the determined sound processing profile.

Optionally, the location of the wireless network comprises a type of location, and wherein the processing unit is configured to determine the sound processing profile based on the type of location of the wireless network.

Optionally, the hearing device comprises a memory unit for storing the location of the wireless network.

Optionally, the processing unit is configured to determine whether the determined location matches with a predetermined location stored in a memory of the hearing device.

Optionally, the processing unit is configured to change the determined sound profile determined based on the location of the wireless network to a different sound profile, if the determined sound profile is not appropriate for the location of the wireless network.

Optionally, the processing unit is configured to change the determined sound profile determined based on the location of the wireless network to a different sound profile based on an input from the user of the hearing device and/or an input from a hearing device dispenser.

Optionally, the hearing device further includes an environment classifier for determining a sound environment of the hearing device; wherein the processing unit is configured to determine whether the determined sound profile corresponds with the sound environment determined by the environment classifier.

Optionally, if the determined sound profile corresponds to the sound environment determined by the environment classifier, then the processing unit is configured to maintain the determined sound profile in association with the location.

Optionally, if the determined sound profile conflicts, diverges or does not correspond to the sound environment determined by the environment classifier, then the processing unit is configured to determine a combined sound profile for the location by determining a first weighting factor for the determined sound profile determined based on the location of the wireless network, and by determining a second weighting factor for the sound environment determined by the environment classifier.

Optionally, the wireless network is a Wi-Fi network, and wherein the processing unit is configured to determine the location of the wireless network based on a service set identification (SSDI) of the Wi-Fi network.

Optionally, the processing unit is configured to determine the location of the wireless network based on a wireless identification marker of the wireless network.

Optionally, the wireless identification marker comprises an identity transmitter having a specific location tag.

Optionally, the processing unit is configured to prevent the determined sound processing profile from being used to determine the processed output signal if: a number of different wireless networks present at a same time or within a predefined time interval exceeds a predefined number; and/or sound processing profiles associated with the number of different wireless networks are conflicting, diverging, or do not correspond with each other.

A system includes a hearing device according to any of the embodiments described herein, and a wireless network; wherein the wireless network is configured to transmit the information to the wireless radio receiver unit of the hearing device.

A method performed by a hearing device includes: converting an audio input signal into a microphone output signal to form an input signal; providing, by a processing unit, a processed output signal based on the input signal for compensating a hearing loss of a user; converting the processed output signal into an audio output signal; receiving information from a wireless network; determining a location of the wireless network based on the information received from the wireless network; and determining a sound processing profile based on the determined location of the wireless network; and wherein the processed output signal is based on the determined sound processing profile.

Other features and details will be described in the detailed description.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
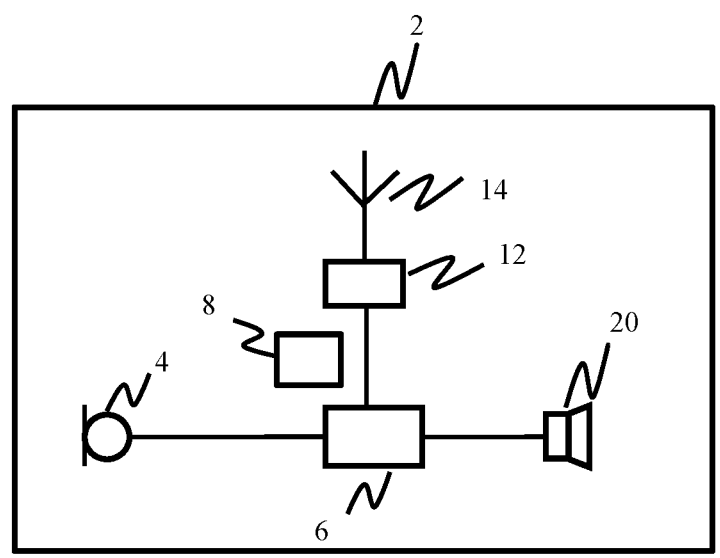
FIG. 1 schematically illustrates an example of a hearing device for improving sound processing.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Throughout, the same reference numerals are used for identical or corresponding parts.

FIG. 1 schematically illustrates an example of a hearing device 2 for improving sound processing. The hearing device 2 comprises a processing unit 6 configured to provide a processed output signal for compensating a hearing loss of a user. The hearing device 2 comprises a microphone 4 connected to the processing unit for converting an audio input signal into a microphone output signal to form an input signal to the processing unit 6. The hearing device 2 comprises a receiver 20 connected to the processing unit 6 for converting the processed output signal into an audio output signal. The hearing device 2 comprises a wireless radio receiver unit 12 connected to the processing unit 6 for receiving information from a wireless network. The processing unit 6 is configured to determine a location of the wireless network based on the information received from the wireless network. The processing unit 6 is configured to establish a sound processing profile based on the determined location of the wireless network. The processing unit 6 is configured to provide that the processed output signal is processed according to the established sound processing profile.

The hearing device 2 may further comprise a radio antenna 14, such as a 2.4 GHz radio antenna, connected to the wireless radio receiver unit 12 for communicating with and/or for receiving information from the wireless network.

The hearing device 2 may further comprise a memory unit 8 connected to the processing unit 6 for storing the location of the wireless network.

Figure 2:
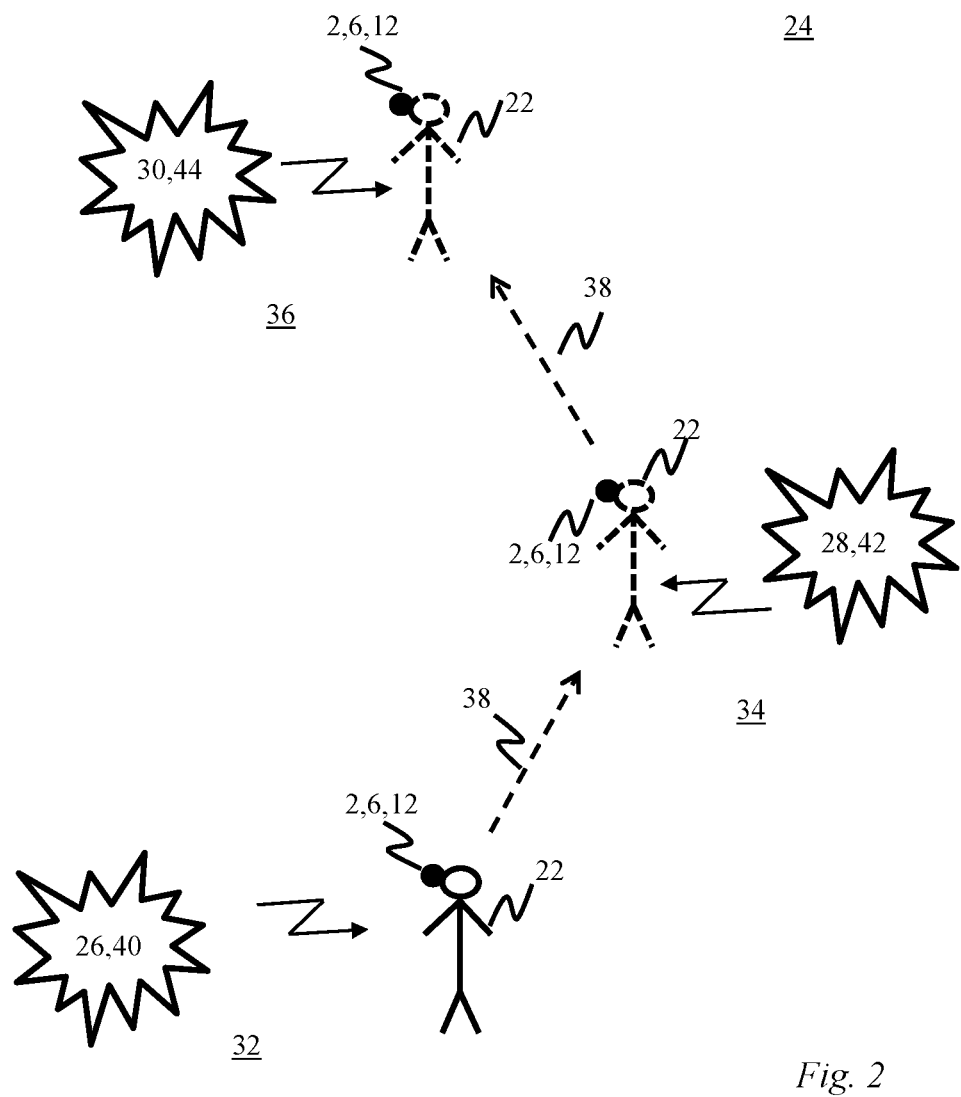
FIG. 2 schematically illustrates an example of a user wearing a hearing device, the user moving around in an area with a number of wireless networks available at different locations in the area.

FIG. 2 schematically illustrates an example of a user 22 moving around in an area 24. A number N of wireless networks 26, 28, 30 are available at different locations 32, 34, 36 in the area 24. The user 22 is wearing a hearing device 2 comprising a wireless radio receiver unit 12 connected to a processing unit 6 for receiving information from the available wireless networks 26, 26, 30. The processing unit 6 is configured to determine the location 32, 34, 36 of each of the wireless networks 26, 28, 30 based on the information received from each of the wireless networks 26, 28, 30. The processing unit 6 is configured to establish a sound processing profile for each location 32, 34, 36 based on the determined location 32, 34, 36 of each of the wireless networks 26, 28, 30. The processing unit 6 is configured to provide that the processed output signal is processed according to the established sound processing profile for the specific location 32, 34, 36 when the user 22 is at the specific location 32, 34, 36 of the specific wireless network 26, 28, 30, respectively.

The user 22 is moving around in the area 24 as indicated by the dashed arrows 38 starting from location 32 where the wireless network 26 is available. As the user 22 moves from location 32 to location 34, the wireless network 28 will become available, and eventually wireless network 26 will not be available anymore. Two or more wireless networks 26, 28, 30 may be available at the same time for the user 22, if any of the networks 26, 28, 30 reaches into the locations 32, 34, 36 of the other networks 26, 28, 30, respectively.

Each of the wireless networks 26, 28, 30 comprises a network identification (ID) 40, 42, 44, respectively. The network identification (ID) 40, 42, 44 is transmitted to the hearing device 2 as indicated by the bend arrows. The network identification (ID) 40, 42, 44 may be a service set identification (SSDI) of a Wi-Fi network if the wireless network is a Wi-Fi network. The network identification (ID) 40, 42, 44 may be a wireless identification marker of the wireless network. The wireless identification marker may be an identity transmitter having a specific location tag.

Figure 3A:
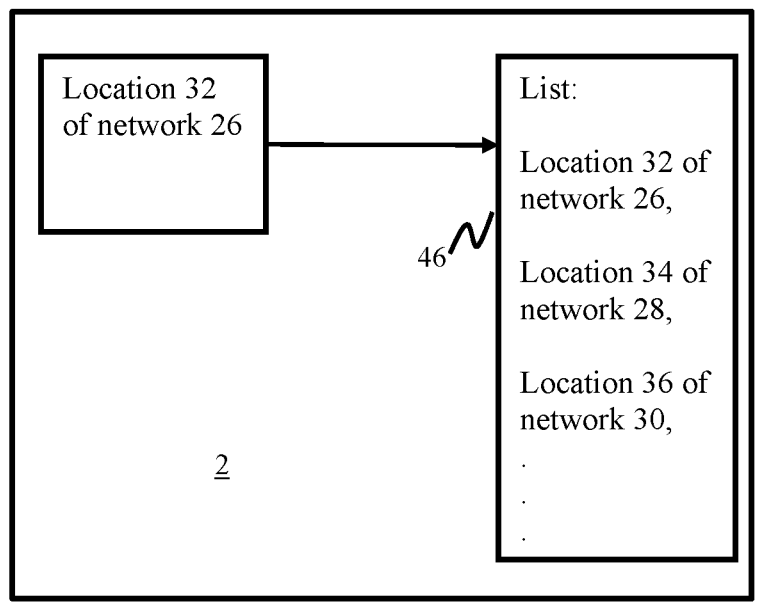
FIG. 3a) schematically illustrates an example of a list of known wireless networks and locations of the wireless networks.

FIG. 3a) schematically illustrates an example of a list 46 of known wireless networks 26, 28, 30 and locations 32, 34, 36 of these known wireless networks. The "positive" list 46 may be stored in a memory unit of the hearing device 2 for storing the locations of the wireless networks. When a new network 26 of a location 32 is detected, this network 26 and/or the location 32 are added to the list 46.

The sound processing profile based on the determined location 32, 34, 36 of the wireless network 26, 28, 30, respectively, is established by that the processing unit is configured to check whether the determined location 32, 34, 36 appears as a known location in list 46 in the memory unit with an associated sound processing profile assigned to the location.

Figure 3B:
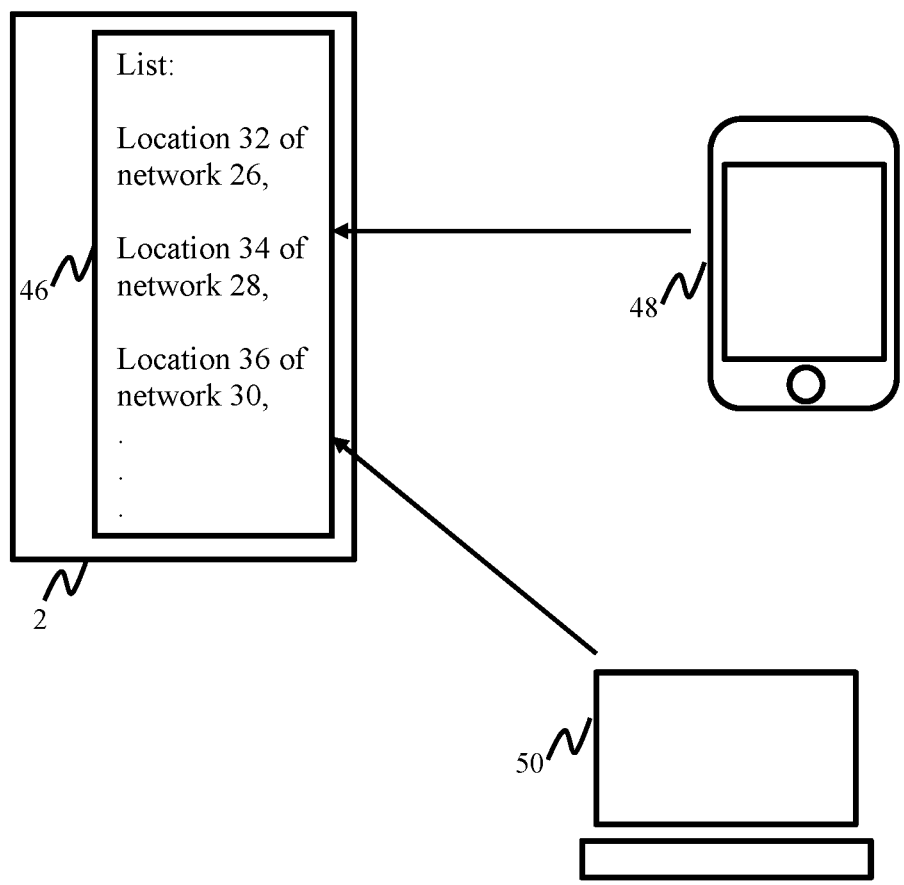
FIG. 3b) schematically illustrates an example of a list of known wireless networks and locations of the wireless networks, where the list can be updated by means of user input via a computer program application.

FIG. 3b) schematically illustrates an example of a list 46 of known wireless networks 26, 28, 30 and locations 32, 34, 36 of these known wireless networks, where the list 46 can be updated by means of user input via a computer program application, such as an app, on a mobile phone 48 or via a computer program application, such as a software program, on a computer 50. Thus the user may type in the location 32, 34, 36, fx in the app on the mobile phone 48, or the user may inform the hearing device dispenser to store a location 32, 34, 36 and e.g. a specific sound profile for this location, fx in the software program on the computer 50.

Figure 4:
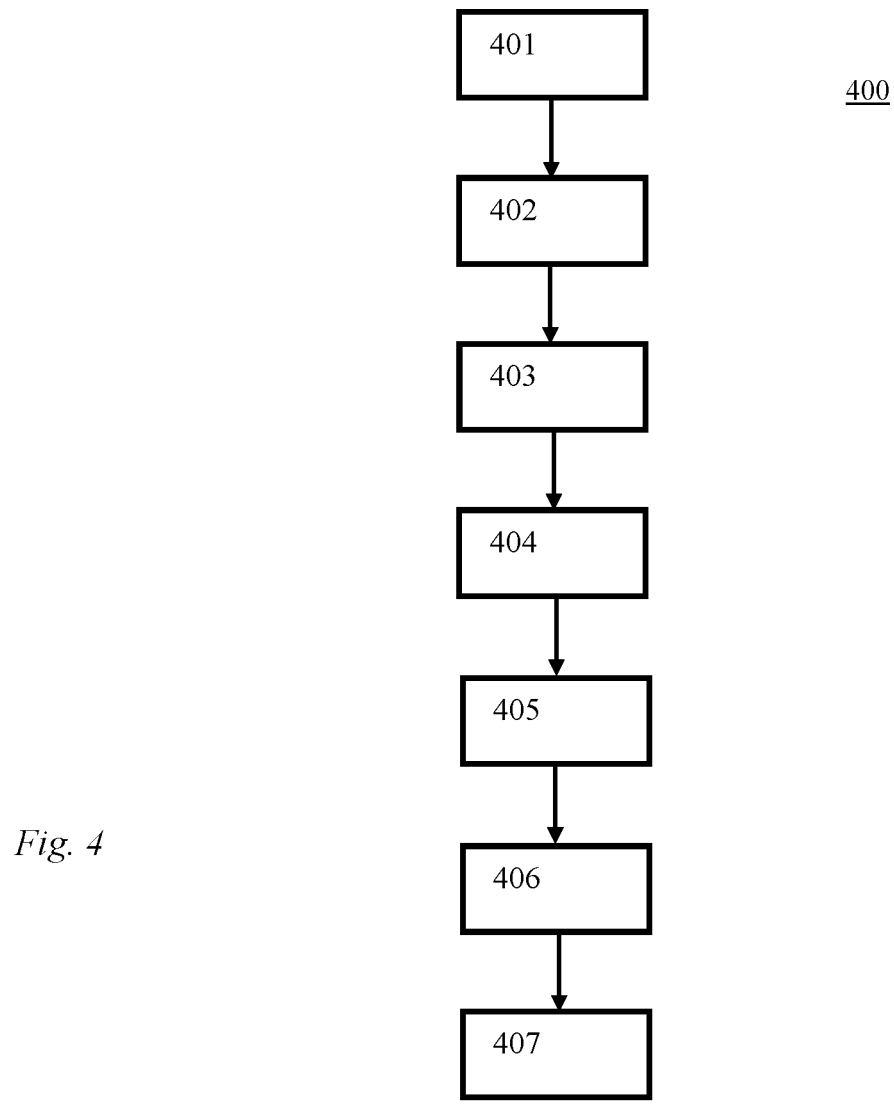
FIG. 4 schematically illustrates an example of a flow chart of a method of improving sound processing in a hearing device.

FIG. 4 schematically illustrates an example of a flow chart of a method 400 of improving sound processing in a hearing device. The method comprises:

In step 401 a processed output signal for compensating a hearing loss of a user is provided.

In step 402 an audio input signal is converted into a microphone output signal to form an input signal.

In step 403 the processed output signal is converted into an audio output signal.

In step 404 information is received from a wireless network.

In step 405 a location of the wireless network is determined based on the information received from the wireless network.

In step 406 a sound processing profile is established based on the determined location of the wireless network.

In step 407 the processed output signal is processed according to the established sound processing profile.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

LIST OF REFERENCES

- 2 hearing device
- 4 microphone
- 6 processing unit
- 8 memory unit
- 12 wireless radio receiver unit
- 14 radio antenna
- 20 receiver
- 22 user
- 24 area
- 26, 28, 30 wireless networks
- 32, 34, 36 locations of wireless networks
- 38 dashed arrows indicating user moving around in area
- 40, 42, 44 network identifications (IDs)
- 46 list
- 48 mobile phone
- 50 computer
- 400 method of improving sound processing in a hearing device
- 401 step of providing a processed output signal for compensating a hearing loss of a user
- 402 step of converting an audio input signal into a microphone output signal to form an input signal
- 403 step of converting the processed output signal into an audio output signal
- 404 step of receiving information from a wireless network
- 405 step of determine a location of the wireless network based on the information received from the wireless network
- 406 step of establishing a sound processing profile based on the determined location of the wireless network
- 407 step of processing the processed output signal according to the established sound processing profile.

The invention claimed is:

1. A hearing device comprising:
   a microphone for converting an audio input signal into a microphone output signal;
   a processing unit configured to provide a processed output signal based on the microphone output signal for compensating a hearing loss of a user;
   a receiver connected to the processing unit for converting the processed output signal into an audio output signal;
   a wireless radio receiver unit connected to the processing unit for receiving information from a wireless network; and
   an environment classifier for determining a sound environment of the hearing device;
   wherein the processing unit is configured to determine a location of the wireless network based on the information received from the wireless network;
   wherein the processing unit is configured to determine a sound processing profile based on the determined location of the wireless network; and
   wherein the processing unit is configured to provide the processed output signal based on the determined sound processing profile;
   wherein if the determined sound profile conflicts, diverges or does not correspond to the sound environment determined by the environment classifier, then the processing unit is configured to determine a combined sound profile for the location by determining a first weighting factor for the determined sound profile determined based on the location of the wireless network, and by determining a second weighting factor for the sound environment determined by the environment classifier.

2. The hearing device according to claim 1, wherein the location of the wireless network comprises a type of location, and wherein the processing unit is configured to determine the sound processing profile based on the type of location of the wireless network.

3. The hearing device according to claim 1, wherein the hearing device comprises a memory unit for storing the location of the wireless network.

4. The hearing device according to claim 1, wherein the processing unit is configured to determine whether the determined location matches with a predetermined location stored in a memory of the hearing device.

5. The hearing device according to claim 1, wherein the processing unit is configured to change the determined sound profile determined based on the location of the wireless network to a different sound profile, if the determined sound profile is not appropriate for the location of the wireless network.

6. The hearing device according to claim 1, wherein the processing unit is configured to change the determined sound profile determined based on the location of the wireless network to a different sound profile based on an input from the user of the hearing device and/or an input from a hearing device dispenser.

7. The hearing device according to claim 1, wherein if the determined sound profile corresponds to the sound environment determined by the environment classifier, then the processing unit is configured to maintain the determined sound profile in association with the location.

8. The hearing device according to claim 1, wherein the wireless network is a Wi-Fi network, and wherein the processing unit is configured to determine the location of the wireless network based on a service set identification (SSDI) of the Wi-Fi network.

9. The hearing device according to claim 1, wherein the processing unit is configured to determine the location of the wireless network based on a wireless identification marker of the wireless network.

10. The hearing device according to claim 9, wherein the wireless identification marker comprises an identity transmitter having a specific location tag.

11. The hearing device according to claim 1, wherein the processing unit is configured to prevent the determined sound processing profile from being used to determine the processed output signal if:
  a number of different wireless networks present at a same time or within a predefined time interval exceeds a predefined number; and/or
  sound processing profiles associated with the number of different wireless networks are conflicting, diverging, or do not correspond with each other.

12. A system comprising the hearing device of claim 1, and a wireless network;
  wherein the wireless network is configured to transmit the information to the wireless radio receiver unit of the hearing device.

* * * * *